(12) United States Patent
Bremmon et al.

(10) Patent No.: US 7,191,997 B2
(45) Date of Patent: Mar. 20, 2007

(54) VIBRATION DAMPENING SYSTEM

(75) Inventors: Jeff Bremmon, Shakopee, MN (US); Jay Dittmer, Prior Lake, MN (US)

(73) Assignee: CSAV, Inc., Savage, MN (US)

( * ) Notice: Subject to any disclaimer, the term of this patent is extended or adjusted under 35 U.S.C. 154(b) by 127 days.

(21) Appl. No.: 11/077,270

(22) Filed: Mar. 10, 2005

(65) Prior Publication Data

US 2005/0224686 A1  Oct. 13, 2005

Related U.S. Application Data

(60) Provisional application No. 60/552,011, filed on Mar. 10, 2004.

(51) Int. Cl.
*F16M 13/00* (2006.01)

(52) U.S. Cl. .................... 248/559; 248/917

(58) Field of Classification Search ............. 248/638, 248/562, 603, 618, 317, 343, 344, 917, 636; 188/268, 379; 174/42; 181/207
See application file for complete search history.

(56) References Cited

U.S. PATENT DOCUMENTS

| | | | | |
|---|---|---|---|---|
| 1,675,391 A * | 7/1928 | Stockbridge | ................ | 174/42 |
| 2,271,935 A * | 2/1942 | Buchanan et. al. | ........... | 174/42 |
| 2,924,420 A * | 2/1960 | Fink | ............. | 248/562 |
| 3,306,399 A * | 2/1967 | Flannelly | ................ | 188/378 |
| 3,314,503 A * | 4/1967 | Neubert | ................ | 188/379 |
| 3,574,340 A | 4/1971 | Busche | | |
| 3,711,624 A * | 1/1973 | Dulhunty | ................ | 174/42 |
| 4,011,929 A * | 3/1977 | Jeram et al. | ............. | 188/268 |
| 4,167,646 A * | 9/1979 | Mathieu | ................ | 174/42 |
| 4,238,104 A | 12/1980 | Hamilton | | |
| D270,689 S | 9/1983 | Boscacci | | |
| 4,403,681 A * | 9/1983 | Desjardins | .............. | 188/379 |
| 4,620,060 A * | 10/1986 | Perinetti | ................ | 174/42 |
| 4,706,788 A * | 11/1987 | Inman et al. | ............. | 188/378 |
| 4,736,701 A * | 4/1988 | Kondo et al. | ............. | 114/340 |
| D309,562 S | 7/1990 | Boscacci et al. | | |
| 4,958,437 A | 9/1990 | Helms | | |
| 4,964,606 A * | 10/1990 | Beam et al. | ............... | 248/333 |
| 4,993,676 A | 2/1991 | Fitts et al. | | |
| 5,042,162 A | 8/1991 | Helms | | |
| 5,487,524 A * | 1/1996 | Bergetz | .................. | 248/613 |
| 5,549,282 A | 8/1996 | Ikeda | | |
| 5,564,536 A * | 10/1996 | Lai | .................... | 188/379 |
| D377,897 S | 2/1997 | Vogels | | |
| 5,735,257 A * | 4/1998 | Walk | .................... | 124/89 |
| 6,070,850 A | 6/2000 | Lehman | | |
| 6,134,964 A * | 10/2000 | Jaenker et al. | ............ | 73/514.21 |
| 6,443,412 B1 * | 9/2002 | Kuhn | ...................... | 248/343 |
| 6,508,343 B2 | 1/2003 | Misaji et al. | | |

(Continued)

*Primary Examiner*—Gwendolyn Baxter
*Assistant Examiner*—Bradley Duckworth
(74) *Attorney, Agent, or Firm*—Patterson, Thuente, Skaar & Christensen, P.A.

(57) ABSTRACT

A vibration dampening system including a upper mounting portion, a lower mounting portion, and a vibration dampening portion coupling the upper mounting portion and the lower mounting portion. In some embodiments, the upper mounting portion is adapted to operably couple with a ceiling, while the lower mounting portion is adapted to operably couple with a monitor such as, a television, computer screen, display screen or the like. In some embodiments, the vibration dampening portion includes a plate and at least one moment arm that extends from the plate.

17 Claims, 5 Drawing Sheets

U.S. PATENT DOCUMENTS 6,672,560 B1    1/2004  Hart
6,682,043 B1 *  1/2004  Hsieh ........................ 248/638
6,802,405 B2 *  10/2004  Barcock et al. ............. 188/268

* cited by examiner

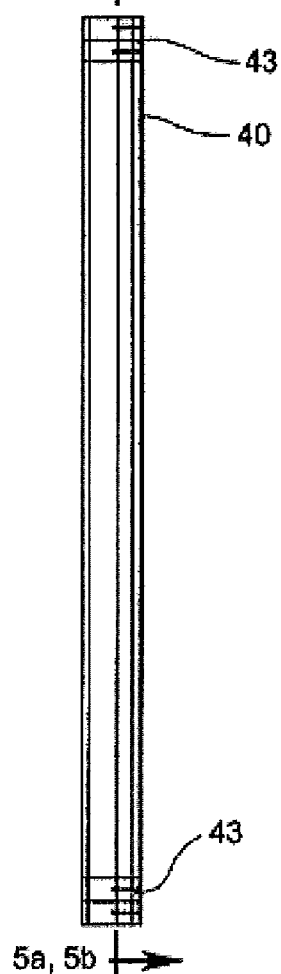
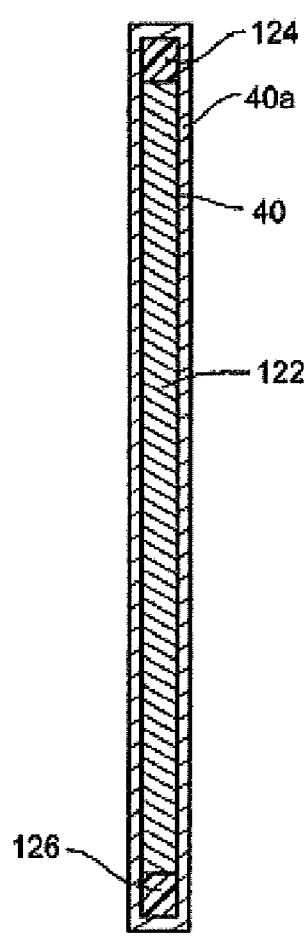
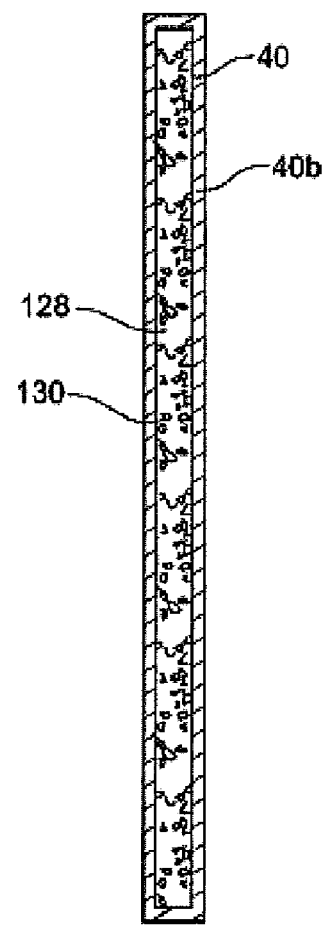
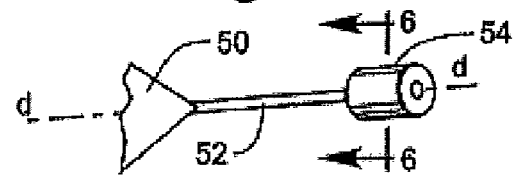
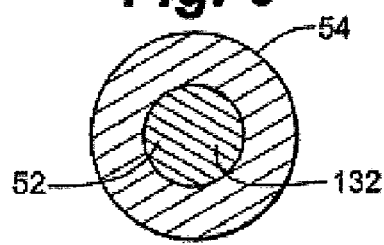
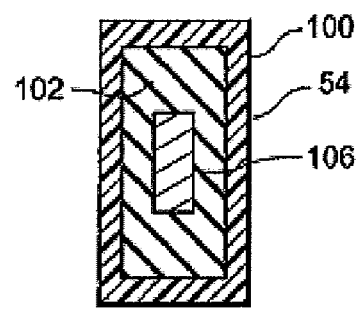

VIBRATION DAMPENING SYSTEM

CROSS-REFERENCE TO RELATED APPLICATIONS

The current applications claims the benefit of priority from U.S. provisional patent application Ser. No. 60/552,011, filed on Mar. 10, 2004, entitled "Vibration Dampening Ceiling Mounting System," hereby incorporated herein by reference.

FIELD OF THE INVENTION

This invention relates generally to a mounting system. More particularly, the present invention relates to a vibration dampening mounting system for mounting an object with respect to a ceiling.

BACKGROUND OF THE INVENTION

In many circumstances, it is desirable to hang items from a ceiling so that the items do not occupy floor space or to protect the items from being damaged or stolen. In particular, there are many situations where televisions are mounted from the ceiling. For example, Busche, U.S. Pat. No. 3,574,340; Fitts et al, U.S. Pat. No. 4,993,676; Vogels, U.S. Pat. No. D377,897; Boscacci, U.S. Pat. No. D309,562; and Boscacci, U.S. Pat. No. D270,689, which are all hereby incorporated by reference herein, each disclose systems for mounting video monitors or similar objects from ceilings.

The desired level of stability of the monitor may be dependent on the type of information or pictures being displayed on the monitor. For example, when constantly moving or changing images are displayed on the monitor, it can be less important for the mounting bracket to maintain the monitor in a substantially motionless position. However, when the monitor is used for displaying large amounts of text or numbers such as, for example, stock quotes and/or related financial information, it becomes increasingly important for the monitor to be substantially motionless. Moreover, it can be desirable to have visual monitors in operating rooms and other facilities that are mounted such that essentially no motion of the monitor is perceived.

While optimally, the ceiling components to which the mounting bracket is attached would be substantially stationary, the stability of the ceiling components may be affected by external factors such as, for example, people walking, dancing or performing other activities on a level that is above the ceiling. Equipment mounted in the ceiling such as is used for heating, ventilation or air conditioning can also cause vibrations in the ceiling, which may be transmitted to the monitor through the mounting bracket.

Since it is not always possible to sufficiently reinforce the ceiling to prevent vibrations, other solutions have been used to minimize the irritation caused by vibration of the monitor such as selecting a larger monitor that is able to display the text in a larger size or moving the monitor to a different location that is not susceptible to experiencing vibrations. Both of these options are undesirable because they result in increased project costs and/or less desirable aesthetics.

SUMMARY OF THE INVENTION

The present invention provides vibration dampening systems that address the above-mentioned needs. The improved vibration dampening systems include a upper mounting portion, a lower mounting portion, and a vibration dampening portion that is proximate the intersection of the upper mounting portion and the lower mounting portion. In an embodiment, the upper mounting portion is adapted to operably couple with a ceiling structure, while the lower mounting portion is adapted to operably couple with a device to be suspended such as for example, a television, computer screen, display screen or the like, a projector, a speaker or other device. In some embodiments, the vibration dampening portion includes a plate and at least one moment arm that extends from the plate. In some embodiments, the vibration dampening portion may include from 1–8 moment arms. Each moment arm may be operably coupled to a dampening element, such as, for example, a weight and/or a housing having an internal space with an elastic member positioned within the internal space, which facilitates reducing the amplitude of any vibrations traveling through the vibration dampening system. In some embodiments, the dampening element may be selectively positionable on the moment arm, in order to facilitate adjusting the dampening ability of the dampening portion. Additionally, in some embodiments, the plate and/or the moment arm can be formed from and/or coated with a material that can absorb energy and reduce vibrations. Suitable vibration reducing materials include, for example, elastomers, carbon nanotubes, polymers loaded with carbon nanotubes, and combinations thereof.

Due to the presence of the vibration dampening portion, the vibration dampening systems of the present disclosure may reduce vibrations and/or movements of objects such as, for example, monitors, projectors or screens that are operably coupled to the lower mounting portion. In other words, the vibration dampening systems of the present disclosure can facilitate mounting, for example, display screens and/or monitors to a ceiling such that the monitors or display screens remain in a substantially motionless position, which can make it easier for individuals to read text and/or graphics displayed on the monitors. In further embodiments, the upper mounting portion and/or the lower mounting portion can include one or more additional vibration damping materials and/or dampening mechanisms, which can further stabilize a monitor or display screen operably connected to the lower mounting portion.

As noted above, in certain circumstances where video display monitors are hung from the ceiling, there are external factors that can cause vibrations in the ceiling and thereby impede with viewing images or text on the monitor. The vibration dampening mounting systems of the present invention may substantially reduce the vibrations by decreasing the amplitude of such vibrations. Reducing the vibrations transferred to monitors and/or screens mounted to a ceiling may facilitate positioning a monitor or screen in desirable locations within a room and may also reduce the size of the monitor required for comfortable or effective viewing. Thus, the improved vibration dampening devices can facilitate desirable aesthetics as well as reduce the costs associated with providing ceiling mounted monitors and/or display screens.

In one aspect, the invention includes a vibration dampening device with an upper mounting portion comprising a shaft and a bracket operably coupled to one end of the shaft, a lower mounting portion comprising a monitor bracket adapted to engage with a monitor, and a vibration dampening portion proximate the intersection of the upper mounting potion and the lower mounting portion. In these embodiments, the vibration dampening portion can include a plate having at least one moment arm operably coupled to the plate, wherein a dampening element is operably coupled to the moment arm.

In a second aspect, the invention pertains to a vibration dampening device that can be operably coupled to a monitor support structure, the monitor support structure including a shaft portion having a first end adapted to engage a ceiling and a second end adapted to engage a monitor. In these embodiments, the vibration dampening device includes a plate having an opening sized to receive the shaft, a fastening structure such as, for example a locking collar or a set screw to fasten the plate to the shaft, and at least one moment arm that extends from the plate. In some embodiments, the moment arm can be operably coupled to a dampening element.

In another aspect, the invention pertains to a method of mounting an electronic device, the method including the step of connecting an electronic to a vibration dampening device, wherein the vibration dampening device includes a vibration dampening portion having a plate and at least one moment arm extending from the plate. In these embodiments, the moment arm can include a dampening element operably coupled to the moment arm. In some embodiments, the electronic device can be a monitor and/or a projector.

BRIEF DESCRIPTION OF THE FIGURES

FIG. 4c is an elevation view of an alternative embodiment of an upper mounting portion according to the invention;

FIG. 5a is a cross-sectional view taken along section 5a—5a of FIG. 4c depicting an upper mounting portion according to an embodiment of the invention;

FIG. 5b is a cross-sectional view taken along 5b—5b of FIG. 4c depicting an upper mounting portion according to an alternative embodiment of the invention;

FIG. 6 is a cross-sectional view of a dampening element taken at section 6—6 of FIG. 6a;

FIG. 6a is a perspective view of the plate, moment arm, and dampening element according to an embodiment of the invention; and.

FIG. 7 is a top view of a dampening element according to an alternative embodiment of the invention.

DETAILED DESCRIPTION OF THE INVENTION

Referring to FIGS. 1–4c, a vibration dampening mounting system is depicted including an upper mounting portion 20, a lower mounting portion 22 and a vibration dampening portion 24 that is proximate the intersection of the upper mounting portion 20 and the lower mounting portion 22. In some embodiments, upper mounting portion 20 can be adapted to engage with a portion of a ceiling structure, while lower mounting portion 22 can be adapted to engage with a monitor such as, for example, a television, computer monitor, display monitor or the like, a projector, a speaker or combinations thereof.

Figure 4:
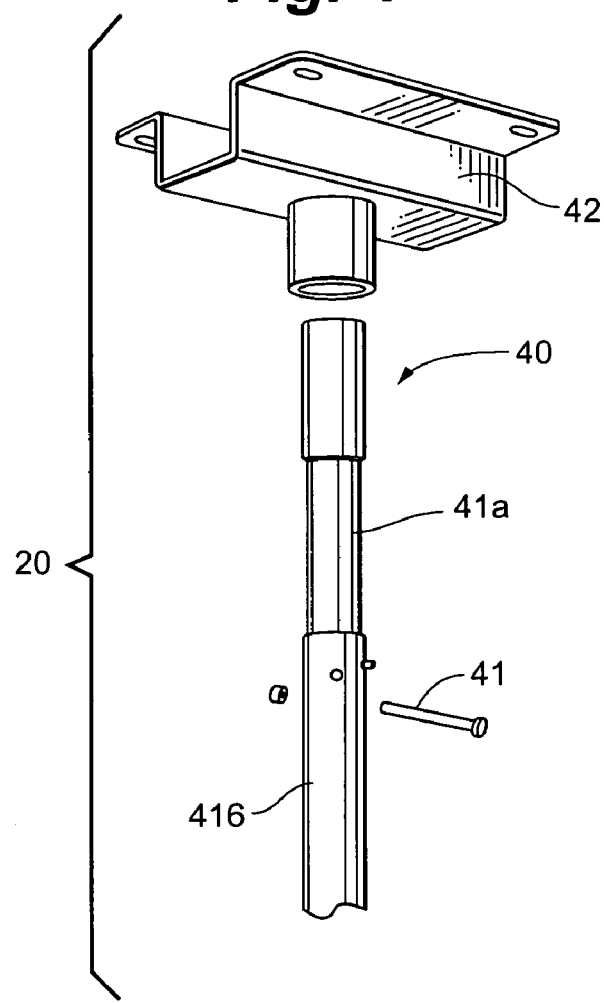
FIG. 4 is an exploded view of an embodiment of an upper mounting portion having a shaft and bracket.
Figure 4A:
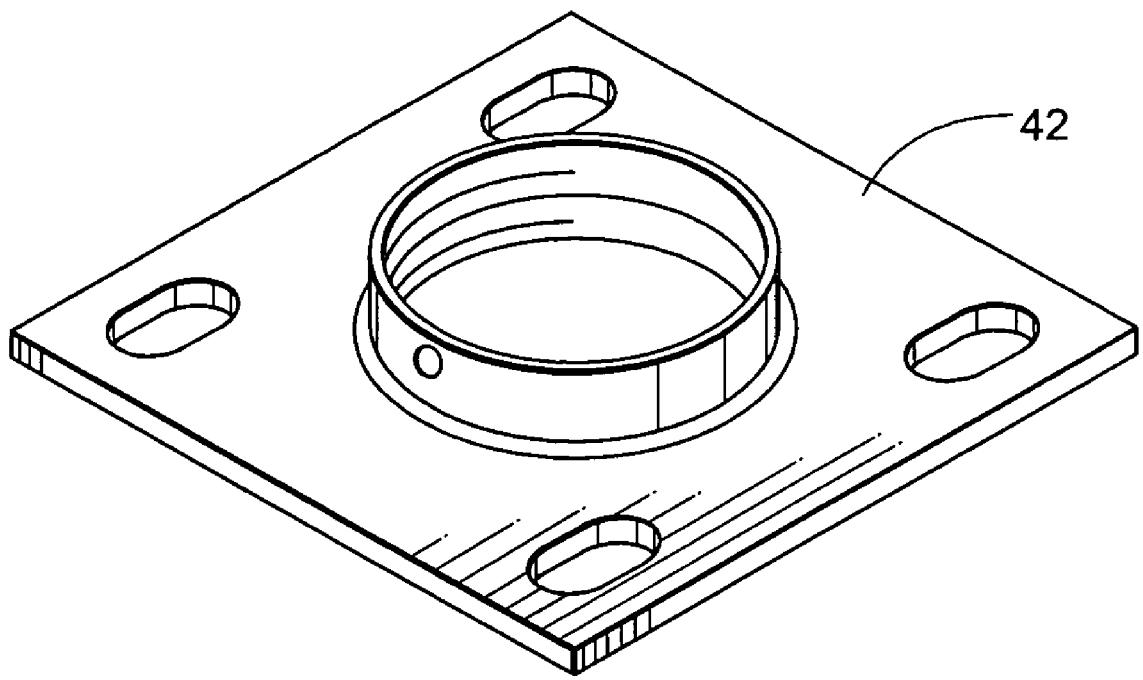
FIG. 4a is a perspective view of an alternate bracket that can be used with the upper mounting portion of FIG. 4.
Figure 4B:
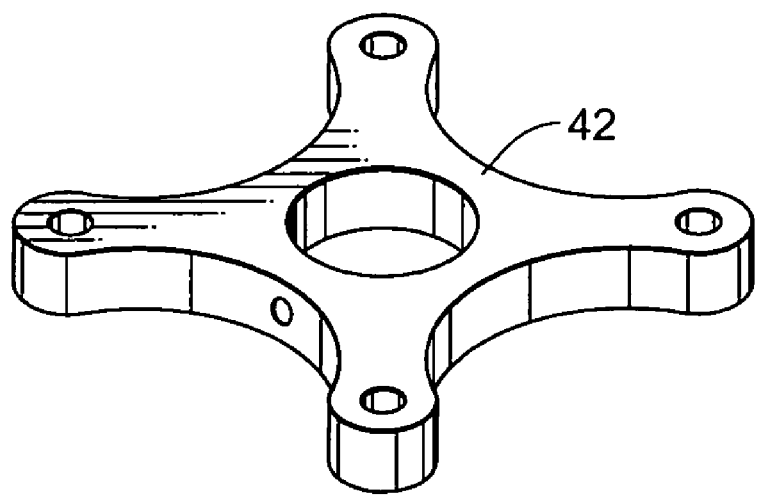
FIG. 4b is a perspective view of an alternate bracket that can be used with the upper mounting portion of FIG. 4.

In some embodiments, upper mounting portion 20 can include shaft 40 and bracket 42 that is attached to an upper end of shaft 40, while in other embodiments, upper mounting portion includes a pipe coupling and an extension column. Bracket 42 is preferably removably attached to the shaft 40. The length and width of shaft 40 can be selected based upon the weight of the monitor or other objects that are to be attached to the vibration dampening mounting system. A length of shaft 40 may be adjustable by forming the shaft 40 from a plurality of sections. In some embodiments, such as depicted in FIG. 4 the length of shaft 40 can be made adjustable by providing a first shaft 41a that is telescopically engaged with a second shaft 41b, wherein one or more set screws or pins 43 can engage first shaft 41a such that first shaft 41a can be maintained in a desired position relative to second shaft 41b. The configuration of bracket 42 can be guided by the type of ceiling or support beam that the upper mounting portion 20 is designed to engage. For example, when the ceiling is concrete, bracket 42 can include a plate with a plurality of holes formed therein that are adapted to receive screws. Examples of suitable brackets are depicted in FIGS. 4, 4a, 4b and 4c. Shaft 40 may include a threaded portion 43 at either or both ends as depicted in FIG. 4c to facilitate attachment to bracket 42 and vibration dampening portion 24.

In an embodiment as depicted in FIGS. 4c and 5a, shaft 40 includes a dampening mechanism and/or dampening material to reduce vibrations traveling along shaft 40. As depicted in FIG. 5a, shaft 40 generally includes exterior portion 40a and interior rod 122. Rod 122 may include damping material 124 positioned proximate one end of rod 122 and dampening material 126 positioned proximate the opposite end of rod 122. In some embodiments, dampening material 124, 126 may be operably coupled to respective end portions of rod 122, while in other embodiments dampening material 124, 126 can be free standing within the interior space of shaft 40. Dampening material 124, 126 can be formed from, for example, natural rubber, synthetic rubber, EPDM rubber, elastomers, carbon nanotubes, polymers loaded with carbon nanatubes and combinations thereof. Dampening material 124, 126 may function to absorb energy and reduce vibrations traveling through shaft 40, in order to reduce or eliminate undesirable vibrations of objects operably coupled to lower mounting portion 22. One of ordinary skill in the art will recognize that the dampening coefficient is a function of the dampening material 124, 126 employed, and thus desired levels of dampening can be achieved by selection of appropriate dampening material(s). Suitable vibration dampening devices are further described in U.S. Pat. No. 6,070,850, entitled "Vibration Dampener," which is hereby incorporated by reference herein.

In other embodiments, as depicted in FIGS. 4c and 5b, shaft 40 generally includes a hollow exterior portion 40b having internal space 128 with a multiplicity of dampening pellets 130 positioned within internal space 128, for reducing vibrations traveling through shaft 40 by absorbing energy. Dampening pellets 130 can be formed from any suitable material that can absorb vibrations including, for example, natural rubber, synthetic rubber, EPDM rubber, elasotmers, carbon nanotubes, polymers loaded with carbon nanotubes, and combinations thereof. Dampening pellets 130 can have any appropriate shape including, for example, a spherical shape, a rod shape with an elongated major axis relative to a minor axis, or a substantially cubical shape. In further embodiments, internal space 128 can be filled with a solid block of dampening material sized to fit into internal space 128.

As described above, the vibration dampening system can include dampening portion 24 that is proximate to the intersection of the upper mounting portion 20 and the lower mounting portion 22. In some embodiments, dampening portion 24 includes a support structure such as plate 50 and at least one moment arm 52 that extends from plate 50. Vibration dampening portion 24 can include upper engagement portion 60 which is adapted to engage shaft 40 of upper mounting portion 20, and lower engagement portion 62 which is adapted to engage shaft 39 of lower mounting portion 22.

Figure 1:
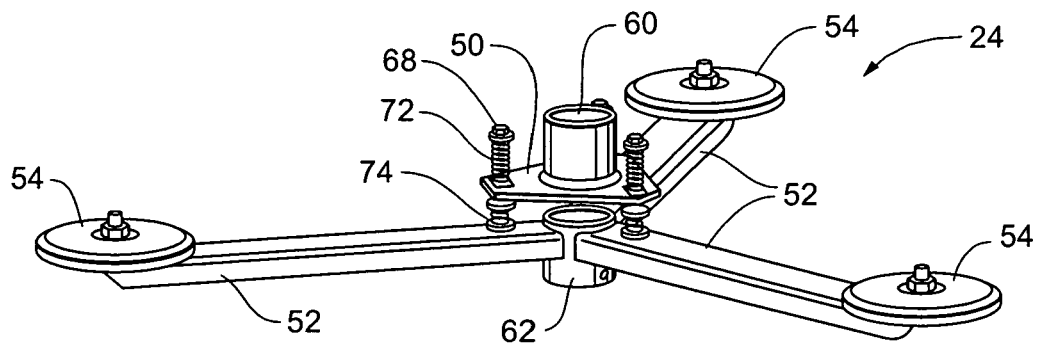
FIG. 1 is perspective view of a vibration dampener element of a mount according to an embodiment of the present invention.
Figure 2:
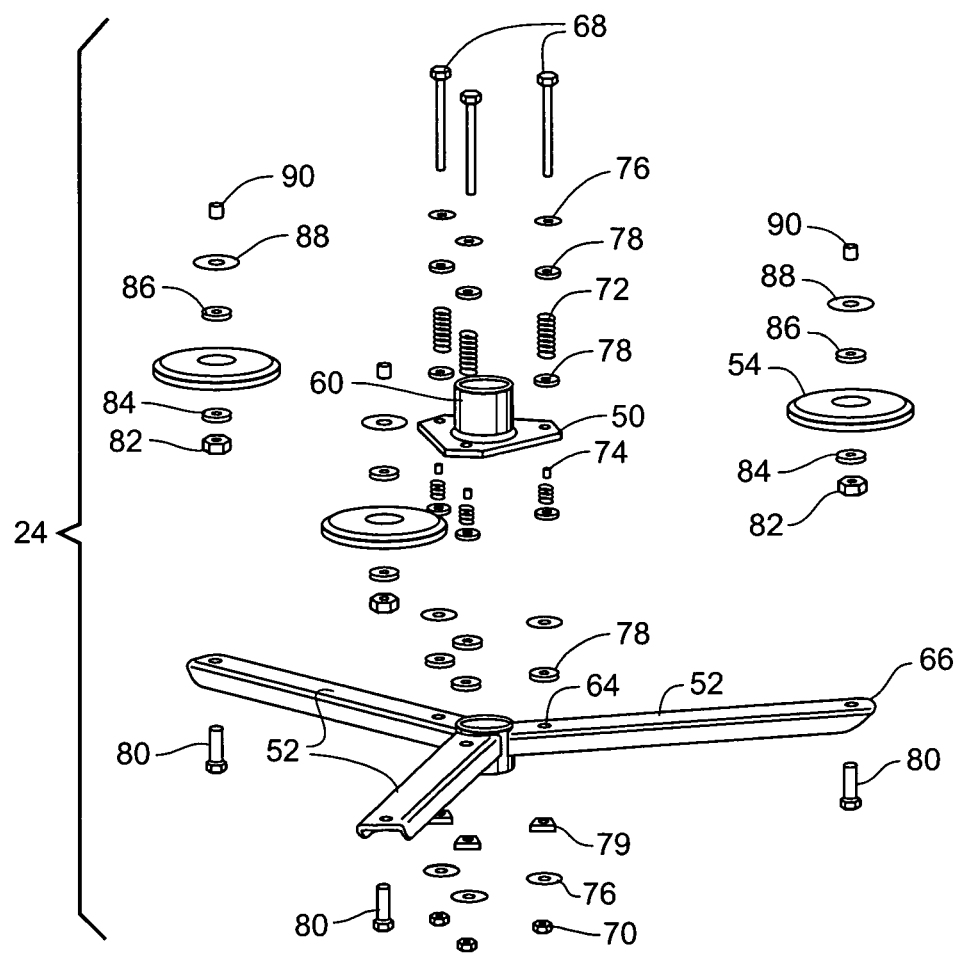
FIG. 2 is an exploded perspective view of the vibration dampening portion of FIG. 1.
Figure 1A:
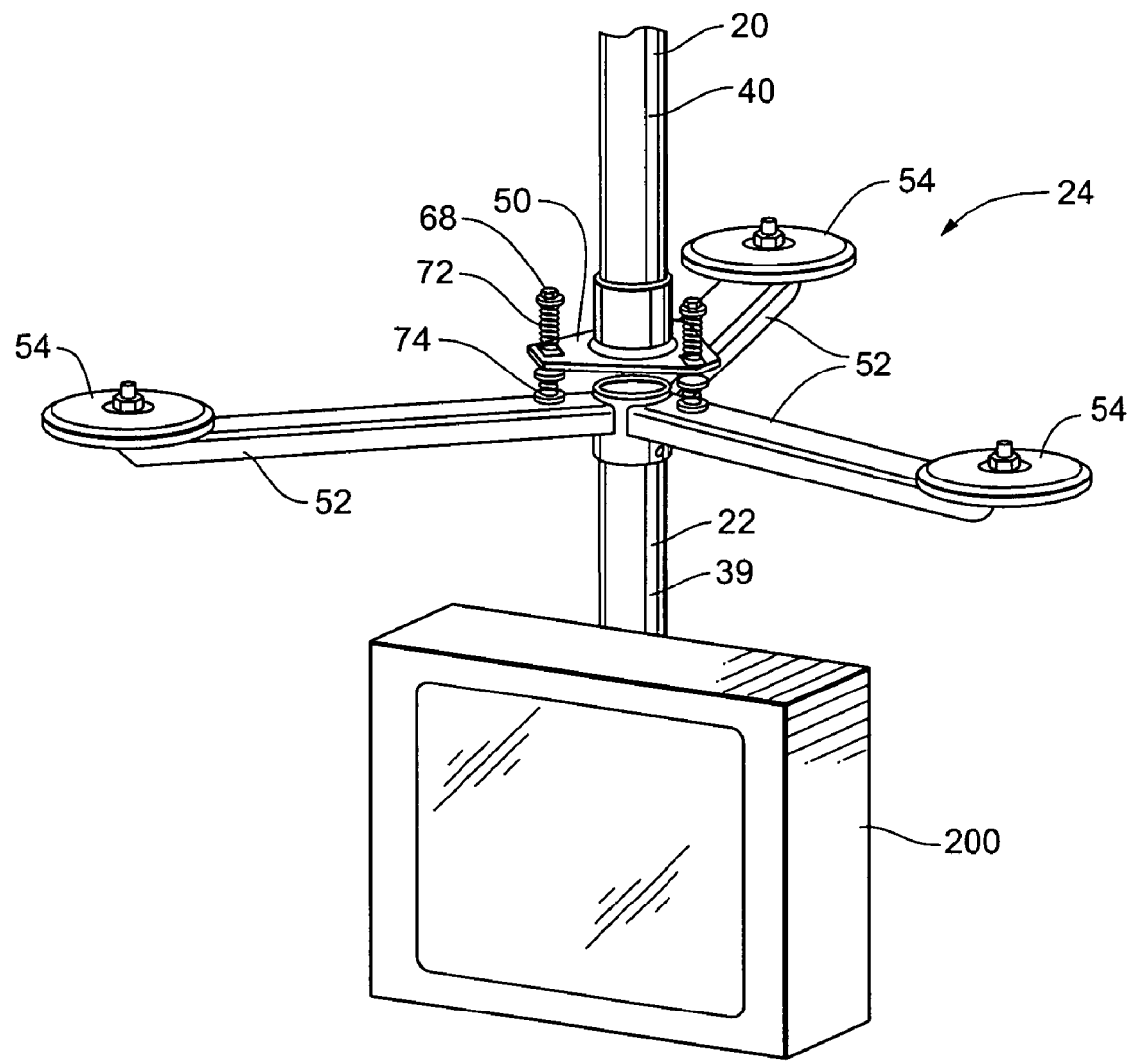
FIG. 1a is a perspective view of a vibration dampening mount according to an embodiment of the invention including upper and lower mounting portions and depicting a display monitor attached to the mount.
Figure 3:
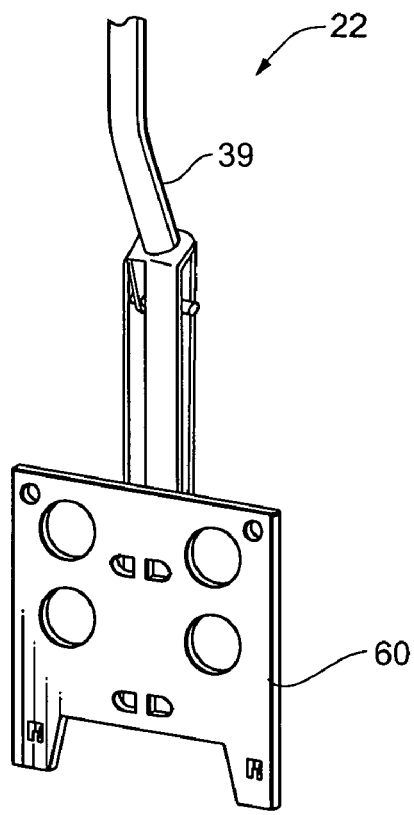
FIG. 3 is a perspective view of an embodiment of a lower mounting portion having a shaft and a monitor bracket operably coupled to the shaft.

As depicted in FIGS. 1 and 2, each moment arm 52 can include a first opening 64 proximate lower engagement portion 60 and a second opening 66. First opening 64 facilitates coupling plate 50 to moment arm(s) 52, while second opening 66 facilitates operably coupling dampening element 54 to moment arm 52. In some embodiments, plate 50 can be coupled to each moment arm 52 by bolt 68, which extends through first opening 64, and engages nut 70. Additionally, bolt 68 and nut 70 can secure a first spring 72 to one side of plate 50 and one or more second springs 74 to the opposite side of plate 50, which facilitates reducing vibrations traveling through vibration dampening portion 24. In some embodiments, first spring 72 can be a heavy gauge spring having a length from about 1 to about 1.5 inches, while second spring(s) 74 can be shorter springs. As depicted in FIG. 2, bolt 68 can also travel through and secure one or more washers 76, sorbothane dampers 78 and stepped sorbothane dampers 79 to vibration dampening portion 24. The sorbothane dampers can reduce vibrations traveling through vibration dampening portion 24. Dampening element 54 can be coupled to moment arm 52 by bolt 80, which can extend through second opening 66, sorbothane damper 82, washer 84, dampening element 54, stepped sorbothane damper 86, second washer 88 and into nut 90.

In one embodiment, as depicted in FIGS. 1 and 2, plate 50 may have a triangular configuration with each side of the plate 50 having an approximately equal length, while in other embodiments plate 50 can have a rectangular shape. One of ordinary skill in the art will recognize that no particular shape of plate 50 is required by the present disclosure, and that additional shapes of plate 50 such as, for example, circular, elliptical and the like are contemplated. In some embodiments, the sides of the plate 50 each can have a length of less than about 12 inches, while in other embodiments the sides of the plate 50 can have a length between about 4 inches and 8 inches. One of ordinary skill in the art will recognize that additional ranges of length of the sides of plate 50 within these explicit ranges are contemplated and are within the scope of the present disclosure. Plate 50 can be fabricated from metals, polymers, polymers loaded with carbon nanotubes, or a combination thereof, and can have a sufficient thickness to support the moment arm(s) 52 in a substantially stationary orientation with respect to plate 50. In one embodiment, plate 50 can be formed out of low carbon cold rolled steel, however, any material that can provide suitable support and rigidity for moment arm(s) 52 may be employed.

As described above, at least one moment arm 52 can extend from plate 50, which facilitates reducing the amplitude of any vibrations traveling through the system. In some embodiments, moment arm 52 can be attached to the plate 50 proximate each corner of the plate 50. For example, when plate 50 has a triangular configuration, there are preferably three moment arms 52. In embodiments where plate 50 has a rectangular shape, there are preferably four moment arms 52. Each moment arm 52 can have a length of up to about 36 inches, preferably from about 10 inches to about 30 inches and more preferably between about 18 and about 24 inches. The number of moment arms and the length of the moment arms employed in a particular embodiment can be guided by the weight of the object that is being mounted on the vibration dampening mounting system, and the frequency and amplitude of vibrations that are to be dampened. In some embodiments, moment arm 52 can be hollow and include an interior space filled with a dampening material such as, for example, elastomers, carbon nanotubes, polymers loaded with carbon nanotubes and combinations thereof. In further embodiments moment arm 52 can be formed from and/or coated with a material that reduces vibrations such as, for example, a polymer loaded with carbon nanotubes or an elastomeric material.

Each of the moment arms 52 can be operably coupled to a dampening element 54, which can reduce vibrations traveling through the vibration dampening system. Dampening element may be selected from various alternative structures including a weight, a housing having an internal space with an elastic member positioned within the internal space or a combination thereof. In one embodiment, dampening element 54 is formed integrally with or is adapted to engage an end portion of moment arm 52, while in other embodiments, as depicted in FIGS. 6 and 6a, dampening element 54 includes a bore 132 adapted to receive moment arm 52 such that dampening element 54 can slideably engage the major axis of moment arm 52, annotated axis d—d in FIG. 6a, to enable lengthwise positioning of dampening element 54 along moment arm 52.

In some embodiments, the weight of dampening element 54 can be greater than the combined weight of plate 50 and the attached moment arm 52. In one embodiment, the weight of dampening element 54 can be from about 1.5 pounds to about 5 pounds, and preferably about 2.5 pounds. It will be appreciated that the weight of dampening element 54 and the length of moment arm 52 is guided by the weight of the monitor, projector or other object that is coupled to the vibration dampening system.

Dampening element 54 can be removeably secured to moment arm 52, which permits different weights and/or dampening elements to be operably connected to moment arm 52. For example, dampening element 54 can include an opening or recess having a screw thread that is adapted to engage with an end portion of moment arm 52 having a corresponding screw thread, which facilitates removeably securing dampening element 54 to moment arm 52. In embodiments where dampening element 54 comprises a bore, a locking collar or a nut and bolt assembly can be used to secure the dampening element to a desired position on moment arm 52. Suitable locking collars are described in, for example, U.S. Pat. No. 6,007,268, entitled "Radial and Axial Locking Release Collar," which is hereby incorporated by reference herein.

Referring to FIG. 7, in some embodiments, dampening element 54 can comprise housing 100 having an elastic element 102 positioned within interior space 104. In some embodiments, weight 106 can be embedded into elastic element 102. Any vibrations traveling through system 10 can by dampened by the energy loss associated with the sliding friction and impact occurring when elastomeric element 102 contact the inside surface of housing 100. In some embodiments, housing 100 can be formed from a rigid material such as metals, polymers or combinations thereof. Suitable polymers include, for example, poly(vinylchloride) (PVC), polycarbonates, high density polyethylene (HDPE) and blends and copolymers thereof. Housing 100 can have a circular cross-section, a rectangular cross-section or the like. Elastic element 102 can be formed from natural rubber, synthetic rubber, an elastomer or combinations thereof. Vibration dampers having a housing with an elastic member positioned within the housing are described in U.S. Pat. No. 6,508,343, entitled "Vibration Damper," which is hereby incorporated by reference herein.

The upper mounting portion 20 is preferably attached proximate a center of the plate 50 so that the plate 50 is substantially balanced about the point of attachment to the upper mounting portion 20.

The lower mounting portion 22 attaches to a lower surface of the plate 50 and can include shaft 39 and a monitor bracket 60 for attachment to a desired type of monitor 200 such as a liquid crystal display or a cathode ray tube. In other embodiments, lower mounting portion 222 can include a bracket adapted to engage with a projector and/or a speaker. In some embodiments, shaft 41 can be formed integrally with shaft 40, while in other embodiments shaft 40 and shaft 39 can be distinct elements mounted to opposite faces of plate 50.

The vibration dampening mounting systems of the present disclosure are particularly suited for areas that have drop-in ceilings. In these applications, the dampening portion 24 is preferably positioned above the drop in ceiling. Configuring the vibration dampening mounting system in this manner enhances the aesthetic appearance created by the installation of the of the vibration dampening mounting system.

The vibration dampening mounting system of the present invention is also suitable for use in mounting objects that generate vibrations such as loudspeakers. Similar to the embodiments described above, this embodiment includes upper and lower mounting portions and a vibration dampening portion.

To operate vibration dampening system, upper mounting portion 20 can be operably connected to a ceiling portion by connecting bracket 42 to an appropriate portion of a ceiling. In embodiments, where a length of shaft 40 is adjustable, the length can be adjusted to position monitor bracket at desired height. A monitor can then be operably coupled to monitor bracket 60 to mount the monitor to lower mounting portion 22.

The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

What is claimed is:

1. A vibration dampening device comprising:
    an upper mounting portion comprising a shaft and bracket operably coupled to one end of the shaft;
    a lower mounting portion comprising a bracket adapted to engage with an electronic device; and
    a vibration dampening portion operably coupling the upper mounting portion and the lower mounting portion, wherein the vibration dampening portion comprises at least one moment arm, and wherein a dampening element is operably coupled to the at least one moment arm.

2. The vibration dampening device of claim 1, wherein the vibration dampening portion includes a plate, the at least one moment art extending outward from the plate, and wherein the plate is operably coupled to each of the upper and lower mounting portions.

3. The vibration dampening device of claim 2, wherein the plate has a generally triangular shape, and wherein the device includes three moment arms operably coupled to the plate, each moment arm having a separate dampening element thereon.

4. The vibration dampening device of claim 2, wherein the plate is formed from a material selected from the group consisting of metals, polymers, polymers loaded with carbon nanotubes, and combinations thereof.

5. The vibration dampening device of claim 1, wherein the dampening element is selected from the group consisting of a weight, and a housing having an internal space with an elastic member positioned within the interior space.

6. The vibration dampening device of claim 5, wherein the weight of the dampening element is greater than a combined weight of the plate and the moment arm.

7. The vibration dampening device of claim 1 wherein the shaft comprises an exterior portion enclosing a rod portion.

8. The vibration dampening device of claim 7, wherein the rod portion has a first end and a second end, and wherein a first dampening material is positioned in the exterior portion proximate the first end and a second dampening material is positioned in the exterior portion proximate the second end.

9. The vibration dampening device of claim 8, wherein the first and second dampening materials are selected form the group consisting of natural rubber, synthetic rubber, elastomers, carbon nanotubes and combinations thereof.

10. The vibration dampening device of claim 1, wherein the shaft comprises an exterior portion enclosing a multiplicity of dampening pellets, wherein the dampening pellets are formed from a material selected from the group consisting of natural rubber, synthetic rubber, elastomers, carbon nanotubes, polymers loaded with carbon nanotubes and combinations thereof.

11. The vibration dampening device of claim 1 wherein the at least one moment arm has a length up to about 36 inches.

12. The vibration dampening device of claim 1 wherein the at least one moment arm has a length from about 18 inches to about 24 inches.

13. The vibration dampening device of claim 1 wherein the at least one moment arm is hollow and has an internal space containing a plurality of dampening pellets.

14. The vibration dampening device of claim 13 wherein the dampening pellets are formed from a material selected from the group consisting of natural rubber, synthetic rubber, elastomers, carbon nanotubes, polymers loaded with carbon nanotubes and combinations thereof.

15. The vibration dampening device of claim 1 wherein the dampening element is removeably secured to the moment arm.

16. The vibration dampening device of claim 1 wherein the moment arm is formed from a material selected from the group consisting of metals, polymers, elasotmers, polymers loaded with carbon nanotubes and combinations thereof.

17. A method of mounting an electronic device to a vibration dampening device, the vibration dampening device comprising an upper mounting portion, a lower mounting portion and a vibration dampening portion proximate the intersection of the upper mounting portion and the lower mounting portion, wherein the vibration dampening portion comprises a plate having at least one moment arm operably coupled to the plate, the method comprising:

operably connecting an electronic device to the lower mounting portion of the vibration dampening device.

* * * * *